United States Patent
Shi (10) Patent No.: US 8,374,326 B2
(45) Date of Patent: Feb. 12, 2013

(54) METHOD AND SYSTEM FOR INTELLIGENT ROUTING

(75) Inventor: Youzhu Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1102 days.

(21) Appl. No.: 11/845,611

(22) Filed: Aug. 27, 2007

(65) Prior Publication Data

US 2008/0043969 A1 Feb. 21, 2008

Related U.S. Application Data

(63) Continuation of application No. PCT/CN2006/000344, filed on Mar. 8, 2006.

(30) Foreign Application Priority Data

Mar. 16, 2005 (CN) .......................... 2005 1 0055231
Apr. 4, 2005 (CN) .......................... 2005 1 0063128

(51) Int. Cl.
- H04M 3/42 (2006.01)
- H04M 3/46 (2006.01)
- H04M 3/54 (2006.01)

(52) U.S. Cl. ........... 379/201.02; 379/201.1; 379/207.02; 379/211.02

(58) Field of Classification Search ............. 379/201.01, 379/201.02, 201.1, 201.12, 207.02, 211.02
See application file for complete search history.

(56) References Cited

U.S. PATENT DOCUMENTS

| | | |
|---|---|---|
| 5,247,571 A | 9/1993 | Kay et al. |
| 5,422,941 A | 6/1995 | Hasenauer et al. |
| 6,134,314 A | 10/2000 | Dougherty et al. |
| 6,631,258 B1 | 10/2003 | Chow et al. |
| 6,711,156 B1 | 3/2004 | Gourraud |
| 6,745,025 B1 | 6/2004 | Chow et al. |
| 7,260,203 B2 * | 8/2007 | Holt et al. ................. 379/211.02 |
| 7,680,259 B2 | 3/2010 | Kent, Jr. et al. |
| 2002/0122547 A1 | 9/2002 | Hinchey et al. |
| 2002/0168061 A1 | 11/2002 | Bruening et al. |
| 2003/0112948 A1 | 6/2003 | Brown et al. |
| 2004/0208305 A1 | 10/2004 | Gross et al. |

FOREIGN PATENT DOCUMENTS

| | | |
|---|---|---|
| CN | 1270747 A | 10/2000 |
| CN | 1309861 A | 8/2001 |
| CN | 1409526 A | 4/2003 |
| RU | 2193823 C2 | 11/2002 |
| WO | WO 93/17515 A1 | 9/1993 |

(Continued)

OTHER PUBLICATIONS

Written Opinion of the International Searching Authority in corresponding PCT Application No. PCT/CN2006/000344 (Jun. 15, 2006).

(Continued)

*Primary Examiner* — Harry Hong
(74) *Attorney, Agent, or Firm* — Leydig, Voit & Mayer, Ltd.

(57) ABSTRACT

Embodiments of the present invention provide methods and systems for intelligent routing. An intelligent routing processing module sets at least one intelligent routing trigger condition and at least one corresponding intelligent routing policy in advances and an incoming call or message is processed according to intelligent routing contact manners in the intelligent routing policy. The intelligent routing trigger condition includes relevant information of the incoming call or message and the intelligent routing policy may include more than one intelligent routing contact manner. The embodiments of the present invention may provide more intelligent routing contact manners and intelligent routing policies for communication routing technology and may make full use of subscriber presence information.

27 Claims, 2 Drawing Sheets

FOREIGN PATENT DOCUMENTS

| | | |
|---|---|---|
| WO | 9823080 A2 | 5/1998 |
| WO | 9965214 A1 | 12/1999 |
| WO | WO 00/35175 A1 | 6/2000 |
| WO | WO 01/72008 A2 | 9/2001 |

OTHER PUBLICATIONS

International Search Report in corresponding PCT Application No. PCT/CN2006/000344 (Jun. 15, 2006).

$1^{st}$ Office Action in corresponding European Application No. 06705730.7 (Feb. 17, 2010).
$2^{nd}$ Office Action in corresponding European Application No. 06705730.7 (Sep. 5, 2011).
$3^{rd}$ Office Action in corresponding European Patent Application No. 06705730.7 (Aug. 21, 2012).
$4^{th}$ Office Action in corresponding European Patent Application No. 06705730.7 (Nov. 20, 2012).

* cited by examiner

METHOD AND SYSTEM FOR INTELLIGENT ROUTING

This application is a continuation of International Patent Application No. PCT/CN2006/000344, filed Mar. 8, 2006, which claims priority to Chinese Patent Application No. 200510055231.3, filed Mar. 16, 2005, and Chinese Patent Application No. 200510063128.3, filed Apr. 4, 2005, all of which are hereby incorporated by reference.

FIELD OF THE INVENTION

The present invention relates to a routing technique in the field of communication technologies, and particularly, to methods and systems for intelligent routing.

BACKGROUND OF THE INVENTION

In conventional circuit switched domain services, a subscriber may subscribe to at least one of multiple called side services, such as call waiting, call forwarding unconditional, call forwarding busy and call forwarding no reply. The multiple called side services provide for incoming calls different called side contact manners of forwarding and waiting. The multiple called side services are independent of each other and their trigger points are set as the following three: the called party being busy, the called party giving no answer and without conditions, which cover limited application scenarios, e.g., a scenario that the subscriber hopes to forward a call during meeting is not covered.

With the development of voice services over packet switched domain, a call intelligent routing service has emerged currently. The call intelligent routing service is customized by a subscriber in advance, and provides different forwarding patterns for incoming calls based on subscriber presence information, such as serial call forwarding, parallel call forwarding, call forwarding to voice mailbox, and call information converted to text information. The subscriber may publish his presence information, such as "I'm in a meeting", in a packet switched domain through network messages such as the Session Initiation Protocol (SIP) PUBLISH message. The scenario that the user hopes to forward the call during meeting is thus fulfilled. However, the inventor of the present invention finds that there are still disadvantages below of the conventional technical scheme.

Firstly, called contract modes provided for incoming calls are mainly limited to call forwarding services and do not cover other effective routing contact manners such as call waiting, queue, and call record converted to email. Therefore there are few routing contact manners.

Secondly, there is a lack of the call intelligent routing service for user groups, e.g., a Centrex group and a pickup group, there is no more than one intelligent routing policy based on different called attribute identities such as a called number or a group number to which the called party belongs either.

Thirdly, the subscriber presence information, as one of the trigger conditions for intelligent routing, includes explicit presence information and implicit presence information; the former is the presence information published in the network by the subscriber in certain manner, while the latter is the natural presence information of the subscriber terminal in the network, such as the device connection status, service applications, and network locations and types. However, not all the possible implicit presence information can be fully used currently, and it is hard for the subscriber, while customizing services, to precisely describe a status of the subscriber when an intelligent routing service is triggered.

Moreover, all conventional messaging services, such as Instant Messaging (IM), Short Message Service (SMS), a Multimedia Messaging Service (MMS), email, voice mail, fax, and paging messaging, have their own application networks respectively. In order to effectively unify these messaging services, a unified messaging service has emerged in the industry. The unified messaging service integrates the messaging services which were previously carried out respectively through networks such as the telephone network, the paging network, the mobile network and the Internet, such that a subscriber may receive messages from various messaging services in any manner, for example, a voice message may be sent through email as the attachment of the email.

To be brief, a unified messaging system may be regarded as an integrated mailbox which may store and forward information of all types from various terminals, including the instant messages, short messages, multimedia messages, email, voice massages, fax and Paging messages. A subscriber may send and receive all these messages anywhere and anytime through devices such as a telephone, a fax machine, a personal computer (in communication with the Internet), a cell phone and a pager.

However, applications of a unified messaging service are still limited because the unified messaging service focuses on the conversion between different types of messages and provides a system framework application that is comparatively fixed, e.g., a unified messaging email box may be provided for the subscriber and all the information received is converted into email to be sent to the subscriber. There are not comprehensive pre-customized intelligent routing policies for all types of messaging services above, for example:

the conversion of various incoming messages is a main service provided, while no other effective contact manner, such as message forwarding or message converted to call, is provided;

the unified messages may not be processed based on all possible presence information of the destination subscriber, and there is no effective conjunction with other related applications, e.g., the presence information may not be in conjunction with real-time call control; as a result, classified demands of the subscriber may not be satisfied, e.g., the subscriber may wish a short message sent from his family to be converted into a voice call that may be answered through an onboard mobile phone while he/she is driving and is unable to check a short message;

the unified messages may not be processed for user groups including the Centrex group and the pickup group, and there are not intelligent routing policies based on different called attribute identities, such as a called number or a group number to which the called party belongs.

SUMMARY OF THE INVENTION

The present invention provides methods and systems for intelligent routing to solve the problem in the prior art of communication routing technology with regard to the lack of routing contact manners and routing policies and the problem that subscriber status information cannot be fully utilized.

The technical scheme in accordance with embodiments of the present invention is described below.

In an embodiment, a method for intelligent routing includes:

triggering an incoming call to an intelligent routing processing module at a designated trigger point;

triggering, by the intelligent routing processing module, an intelligent routing service, acquiring relevant information of the incoming call and composing at least one intelligent routing trigger condition of the incoming call with the relevant information;

matching the intelligent routing trigger condition of the incoming call with preset intelligent routing trigger conditions and obtaining at least one intelligent routing policy including at least one intelligent routing contact manner; and routing the incoming call according to the intelligent routing contact manner in the intelligent routing policy.

In an embodiment, a system for intelligent routing includes:

a call session control function unit, adapted for triggering an incoming call;

an intelligent routing processing module, in communication with the call session control function unit, adapted for receiving the incoming call from the call session control function unit, performing logic control for an intelligent routing service; and a subscriber presence information processing module, in communication with one of the intelligent routing processing module and the call session control function unit, adapted for collecting and publishing subscriber presence information and providing the subscriber presence information for the intelligent routing processing module.

In an embodiment, a method for intelligent routing includes:

triggering an incoming message to an intelligent routing processing module;

triggering, by the intelligent routing processing module, an intelligent routing service, acquiring relevant information of the incoming message and composing at least one intelligent routing trigger condition of the incoming message with the relevant information of the incoming message;

matching, by the intelligent routing processing module, the intelligent routing trigger condition of the incoming message with preset intelligent routing trigger conditions, obtaining at least one intelligent routing policy which comprises at least one intelligent routing contact manner and sending the intelligent routing policy to a unified messaging server; and routing, by the unified messaging server, the incoming message according to the intelligent routing contact manner in the intelligent routing policy.

In an embodiment, a system for intelligent routing includes:

a unified messaging server, adapted for triggering an incoming message, processing the incoming message according to an intelligent routing policy;

an intelligent routing processing module, in communication with the unified messaging server, adapted for acquiring the intelligent routing policy according to the incoming message triggered by the unified messaging server, and providing the intelligent routing policy for the unified messaging server; and a subscriber presence information processing module, in communication with the intelligent routing processing module, adapted for collecting and publishing subscriber presence information, and providing the subscriber presence information for the intelligent routing processing module.

DETAIL DESCRIPTION OF THE INVENTION

Embodiments of the present invention are described with reference to accompanying drawings.

According to an embodiment of the present invention, an intelligent routing processing module sets intelligent routing trigger conditions and intelligent routing policies in advance, and processes an incoming call or message in accordance with an intelligent routing contact manner in the intelligent routing policy. The intelligent routing trigger conditions include relevant information of the incoming call or message, and the intelligent routing policy may include one or more intelligent routing contact manners. The relevant information of the incoming call or message includes the called attribute identity, the incoming call attribute, the called presence information and the current time.

A method and a system for intelligent routing in accordance with an embodiment of the present invention provide, for a voice or video call with a designated destination, a call intelligent routing service based on one or more called attribute identities, the incoming call attribute, the called presence information and the current time, such that the incoming call may be processed according to one or more intelligent routing contact manners in the intelligent routing policy customized in advance by a destination subscriber. The incoming call will be processed until an application of a contact manner succeeds (the application of announcement pickup excluded) or until all the intelligent routing contact manners have been handled.

Figure 1:
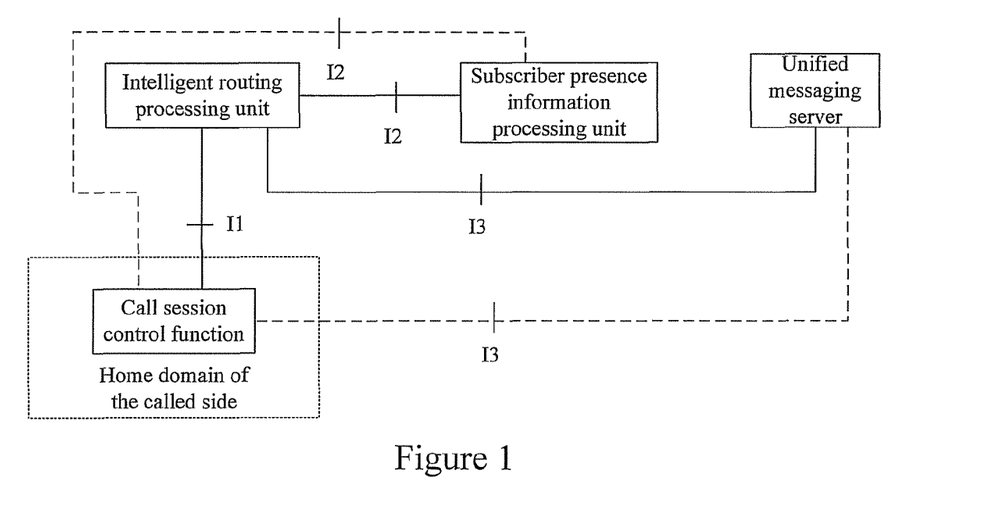
FIG. 1 is a schematic diagram illustrating the structure of a system for intelligent routing in accordance with an embodiment of the present invention.

The intelligent routing system provided by the embodiment of the present invention is shown in FIG. 1, including a call session control function unit, an intelligent routing processing module in communication with the call session control function unit, a subscriber presence information processing module in communication with the intelligent routing processing module or in communication with the call session control function unit, and a unified messaging server.

The call session control function unit provides, for the calls of a subscriber, processing functions including session proceeding, addressing, session status management, etc. The call session control function unit is an independent physical device, such as a soft switch. The subscriber may access, in certain manner, the call session control function unit that is registered to the home domain of the subscriber.

The intelligent routing processing module provides the subscriber with hosting environment of logic control of intelligent routing service, it may be an independent physical device, e.g., an application server, in such a case, an interface I1 is a Session Initiation Protocol (SIP) interface; or the intelligent routing processing module may be resident, with an interface I1 being a self-defining internal interface, in the call session control function unit.

The subscriber presence information processing module collects and publishes subscriber presence information, and provides subscriber presence information needed in service control for the call intelligent routing service. The subscriber presence information includes explicit presence information and implicit presence information. The subscriber presence information processing module may be a logic function network element, and the logic function network element is in communication and interacts with the intelligent routing processing module through the interface I2, or is in communication with the call session control function unit through the interface I2 and interacts with the intelligent routing processing module via the call session control function unit. The subscriber presence information processing module may be an independent physical device such as a presence server, at this point, the interface I2 is an SIP interface through which the subscriber presence information is sent to the intelligent routing processing module. Optionally, the subscriber presence information processing module may be resident, with the interface I2 being a self-defining internal interface, in the intelligent routing processing module.

The unified messaging server processes various types of messages, generates and sends the email, SMS, MMS and IM for the call intelligent routing service. The unified messaging server is usually an independent physical device which is in communication connection with and interacts with the intelligent routing processing module through the interface I3, or is in communication connection with the call session control function unit through the interface I3 and interacts with the intelligent routing processing module via the call session control function unit. The Interface I3 is an SIP interface.

The destination subscriber in the embodiment of the present invention has an identifiable unique public identity in a communication network, i.e., a called number, which may be a telephone number of the destination subscriber, a Uniform Resource Locator (URL) address, a special service number, a telephone exchange number, etc.

In the intelligent routing method and system provided in the embodiment of the present invention, the called attribute identity may be the called number or the number of the user group to which the called party belongs, and the intelligent routing trigger condition includes the called attribute identity, the incoming call attribute, the called presence information and the current time. An intelligent routing trigger condition may correspond to multiple intelligent routing contact manners including incoming call barring, serial call forwarding, parallel call forwarding, call forwarded to voice mailbox or secretary station, call converted to email, call converted to data message, call distributing, call waiting, queue, announcement pickup and callback register.

The intelligent routing processing module acquires a destination address, i.e. the called number, from an initial incoming call and records the destination address as the called attribute identity. The intelligent routing processing module may also search attribute data sheets of the called party, obtain the valid number of a group to which the called party belongs, such as a Centrex group number or a pickup group number, and record the valid number of a group as the called attribute identity. The pickup group is a group in which all group members may pick up an incoming call in a same way.

From the initial incoming call, the intelligent routing processing module may also acquire and record attributes of the incoming call, which may include one or any combination of the caller number, the media type of the incoming call and the call attribute of the incoming call. The media type of the incoming call refers to media capability and coding modes supported by the incoming call, such as voice and video. The incoming call attribute may be distance call, Centrex in-group call, Centrex out-group call, etc.

The called presence information is one or the combination of the explicit presence information and the implicit presence information of the called party. The explicit presence information is presence information published by the subscriber in a network by a means, e.g. by an SIP PUBLISH message which is from the subscriber terminal to the network and contains the presence information; the implicit presence information is current natural presence information of the subscriber terminal in the network, such as connection statuses of devices, service applications, and location and type of the visited network. The methods through which the intelligent routing processing module acquires the subscriber presence information include the following.

Method A: the call session control function unit of the home domain of the called party triggers a message containing the subscriber presence information to the intelligent routing processing module, such as the SIP PUBLISH message, call signaling message, network registration message and network de-registration message. The intelligent routing processing module acquires and records the subscriber presence information; Method B: the subscriber presence information is maintained and managed by the presence server in the network, and the intelligent routing processing module subscribes to the subscriber presence information needed at the presence server, e.g., subscribes through an SIP SUBSCRIBE message; the presence server informs, e.g., through an SIP NOTIFY message, the intelligent routing processing module of the subscriber presence information when a subscription message is received or when the subscriber presence information changes.

The destination subscriber has to customize intelligent routing trigger conditions and corresponding intelligent routing contact manners in advance so as to utilize intelligent routing services. Generally, the intelligent routing trigger conditions and corresponding intelligent routing contact manners may be designed in the form of a data sheet called a call intelligent routing service data sheet. As the called attribute identity may be the called number or the number of the user group to which the called party belongs, such as a Centrex group number or a pickup group number, there are multiple call intelligent routing service data sheets, such as a user call intelligent routing service data sheet, a Centex group call intelligent routing service data sheet, and a pickup group call intelligent routing service data sheet. Table 1 and Table 2 below show the exemplary designs of the user call intelligent routing service data sheet and the Centex group call intelligent routing service data sheet respectively (the two data sheets shown do not include all possible fields and are not the only format of such data sheets).

TABLE 1

| Intelligent routing trigger conditions | | | | | Intelligent routing contact manners |
|---|---|---|---|---|---|
| Called number | Incoming call attribute | Called presence information | Time | Processing order No. | Incoming call barring Serial call forwarding Parallel call forwarding Call forwarded to voice mailbox or secretary station Call converted to email Call converted to data message Call distributing Call waiting Queue Announcement pickup Callback register |

TABLE 2

| Intelligent routing trigger conditions | | | | | Intelligent routing contact manners |
|---|---|---|---|---|---|
| Number of the Centrex group to which the called party belongs | Incoming call attribute | Called presence information | Time | Processing order No. | Incoming call barring<br>Serial call forwarding<br>Parallel call forwarding<br>Call forwarded to voice mailbox or secretary station<br>Call converted to email<br>Call converted to data message<br>Call distributing<br>Call Waiting<br>Queue Announcement<br>pickup<br>Callback register |

The processing order number (No.) includes Arabic numerals starting from 1, indicating the processing order of the contact manners of an intelligent routing policy. Eleven intelligent routing contact manners are given in the examples above and every entry set by the destination subscriber in the data sheet may include only one contact manner, i.e., an intelligent routing trigger condition plus a processing order number matches only one contact manner. An identical intelligent routing trigger condition may correspond to one or more contact manners with different processing order numbers, and multiple contact manners organized in a series according to their processing order numbers compose an intelligent routing policy.

The destination subscriber may set the call intelligent routing service data sheets above according to his own wish, and the data in the data sheets will be loaded into the intelligent routing processing module. The called attribute identity herein is a required field while the fields of incoming call attribute, called presence information and time are optional. If the destination subscriber does not set a value for an optional field, the field will not be considered while matching the intelligent routing trigger conditions.

Figure 2:
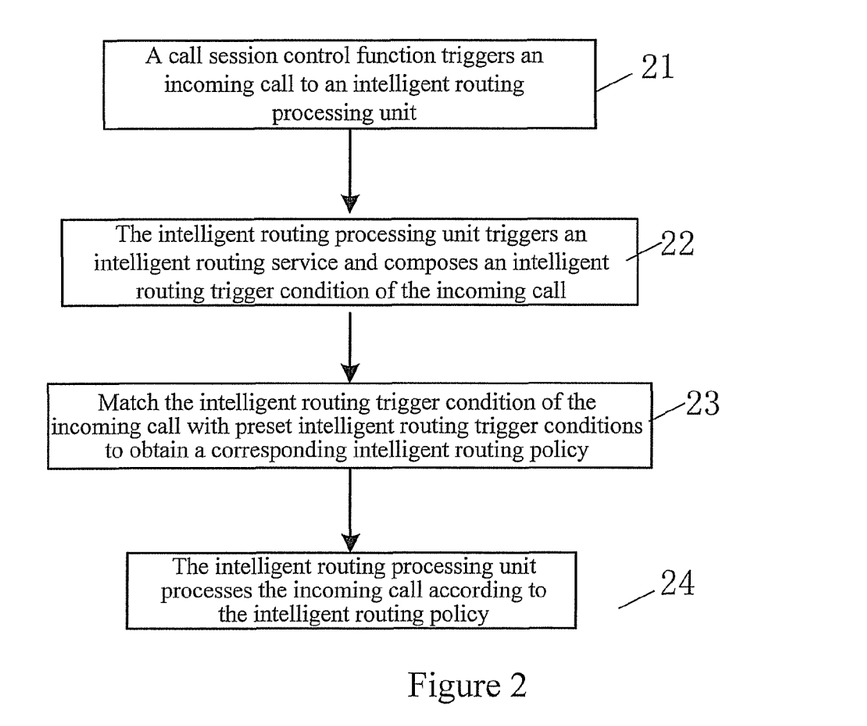
FIG. 2 is a flowchart of a method for intelligent routing in accordance with an embodiment of the present invention.

The flowchart of a method for intelligent routing provided by an embodiment of the present invention is shown in FIG. 2, including the following.

Block 21: a call session control function unit of the home domain of the called party triggers an incoming call, e.g., a voice or video incoming call, at a designated trigger point to an intelligent routing processing module without any condition or according to the static configuration data.

In the process of triggering the incoming call to the intelligent routing processing module at the designated trigger point, the call session control function unit triggers the incoming call to the intelligent routing processing module only when an initial incoming call is received, or only when a failure response to the initial incoming call is received.

Block 22: the intelligent routing processing module triggers intelligent routing services, generates at least one intelligent routing trigger condition for the incoming call according to the called attribute identity and the incoming call attribute that are acquired from the incoming call, the called presence information and the current time.

The intelligent routing processing module generates one intelligent routing trigger condition according to certain called attribute identity, the incoming call attribute and the called presence information plus current time; or the intelligent routing processing module generates multiple intelligent routing trigger conditions according to more than one different called attribute identities respectively and the same incoming call attribute, the called presence information and the current time.

The trigger point at which the intelligent routing processing module triggers the call intelligent routing service for an identical incoming call can be one of the following three scenarios:

firstly, the intelligent routing processing module triggers the intelligent routing service once only in response to receiving the initial incoming call;

secondly, the intelligent routing processing module triggers the intelligent routing service once only in response to receiving a first failure response to the incoming call;

thirdly, when the intelligent routing processing module has triggered the intelligent routing service once in response to receiving the initial incoming call and the application of the intelligent routing service has failed, the intelligent routing processing module triggers the intelligent routing service once again only in response to receiving the first failure response to the incoming call.

Block 23: match the generated intelligent routing trigger condition with preset intelligent routing trigger conditions. When a preset intelligent routing trigger condition is found to be matched with the generated intelligent routing trigger condition, preset intelligent routing contact manners may be obtained. Through matching the generated intelligent routing trigger condition, multiple intelligent routing contact manners in a series according to their processing order numbers are obtained and an intelligent routing policy is composed.

In the embodiment of the present invention, the called attribute identity may be the called number and the numbers of the user groups to which the called party belongs at the same time, thus there may be one or more intelligent routing trigger conditions for one incoming call. When the intelligent routing processing module triggers the intelligent routing service, the intelligent routing processing module matches different called attribute identities (e.g., the called number, the Centrex group number of the called party and the pickup group number of the called) and the same incoming call attribute, called presence information and current time with all possible preset intelligent trigger conditions in turn, so as to obtain at least one routing policy.

As shown in Table 1, the intelligent routing processing module searches the user call intelligent routing service data sheet according to the called number, incoming call attribute, called presence information and current time, and obtains a user intelligent routing policy if the searching succeeds. As shown in Table 2, if the called party also has a valid group number, such as a Centrex group number, the intelligent routing processing module also searches the Centrex group call intelligent routing service data sheet according to the Centrex group number, incoming call attribute, called presence information and current time, and obtains a Centrex group intelligent routing policy if the searching succeeds.

Block 24: the intelligent routing processing module processes the incoming call according to the intelligent routing contact manners in the obtained intelligent routing policy.

When more than one intelligent routing policy is obtained, the intelligent routing processing module may handle every intelligent routing policy according to agreed or preset order, or may apply only the intelligent routing policy with the highest priority according to agreed or preset priority.

The intelligent routing contact manners in the intelligent routing policy provided by the embodiment of the present invention may be one or any orderly combination of incoming call barring, serial call forwarding, parallel call forwarding, call forwarded to voice mailbox or secretary station, call converted to email, call converted to data message, call distributing, call waiting, queue, announcement pickup and callback register; however, the intelligent routing contact manners provided by the embodiment of the present invention are not limited to the above and may include other intelligent routing contact manners. The intelligent routing processing module applies each intelligent routing contact manner according to the predetermined order until the application of a contact manner succeeds (the application of announcement pickup excluded), thus the call intelligent routing service is terminated even if there are other preset contact manners or other intelligent routing policies left unprocessed. Optionally, when the applications of all contact manners fail (the application of announcement pickup excluded), the intelligent routing processing module continues with other intelligent routing policies if there are still other intelligent routing policies to be processed; otherwise, the call intelligent routing service is terminated.

The method through which the intelligent routing processing module processes the incoming call according to the obtained intelligent routing policy includes the following processing patterns.

First, the destination subscriber sets a contact manner of incoming call barring in the intelligent routing policy, showing that he bars the incoming call. The intelligent routing processing module directly bars the incoming call and thus the application of the contact manner of incoming call barring succeeds.

Second, the destination subscriber sets a contact manner of serial call forwarding in the intelligent routing policy, which includes one or more forwarding destination addresses, showing that the incoming call shall be forwarded to the forwarding destination addresses according to a predetermined order until one of the forwarding destination addresses answers, or until none of the forwarding destination addresses answers. The intelligent routing processing module initiates a new call to every forwarding destination address one by one according to the predetermined order until the new call is answered, or until none of the forwarding destination addresses answers. When calling a forwarding destination address, the intelligent routing processing module starts up an answer monitor timer in response to receiving a ring signal. If the forwarding destination address has not yet answered when the answer monitor timer expires, the intelligent routing processing module regards that the forwarding destination address cannot answer. The duration of the answer monitor timer for a forwarding destination address may be designated by the destination subscriber directly in the intelligent routing policy, or be designated by default by the intelligent routing processing module according to an agreement.

Third, the destination subscriber sets a contact manner of parallel call forwarding in the intelligent routing policy, which includes one or more forwarding destination addresses, showing that the incoming call shall be forwarded to all of the forwarding destination addresses at the same time until a first forwarding destination address is answered, or until none of the forwarding destination addresses can be answered. The intelligent routing processing module initiates new calls to all forwarding destination addresses at the same time until a first new call is answered, then the intelligent routing processing module releases all other new calls which are yet to be answered, or until none of the forwarding destination addresses can be answered.

Fourth, the destination subscriber sets a contact manner of call forwarded to voice mailbox or secretary station in the intelligent routing policy, which includes a number of the voice mailbox or a number of the secretary station, showing that the incoming call should be forwarded to the voice mailbox or the secretary station. The intelligent routing processing module initiates a call to the voice mailbox or the secretary station until the call is answered, or until the voice mailbox or the secretary station does not answer.

Fifth, the destination subscriber sets a contact manner of call converted to email in the intelligent routing policy, which includes one or more forwarding email addresses, showing that caller side information and/or a message left of the incoming call should be forwarded to the forwarding email addresses one by one according to a predetermined order until a forwarding email address receives the caller side information and/or message left of the incoming call, or until none of the forwarding email addresses can be reached. The method includes the processes of generating an email containing the caller side information and/or the message left of the incoming call by a unified messaging server, forwarding the email to the forwarding email addresses one by one according to a predetermined order until a forwarding email address receives the email, or until none of the forwarding email addresses can be reached. The email may be generated through one of the following methods:

(1) the intelligent routing processing module initiates a new initial request to the unified messaging server for the incoming call, it is indicated in the new initial request that the incoming call shall be converted to email and the forwarding email addresses are also designated in the new initial request; in response to receiving and parsing the new initial request, the unified messaging server applies for media resources to notify the caller of the incoming call to leave a message, and when the caller has left a message, generates an email containing the caller number of the incoming call and the message left by the caller;

(2) the intelligent routing processing module directly applies for media resources to notify the caller to leave a message, and when the caller has left a message, sends a message that contains both the caller number of the incoming call and the message left by the caller to the unified messaging server to indicate that the incoming call shall be converted to email and to designate the forwarding email addresses; in response to receiving the message, the unified messaging server parses the message and generates an email containing the caller number of the incoming call and the message left by the caller.

The format of the message left by the caller may be one of the following: the URL link address of a record file, a record file in Multipurpose Internet Mail Extensions (MIME) format, the text format of a record converted by an Automatic Speech Recognition (ASR) resource for which the unified messaging server or intelligent routing processing module has applied.

If the caller fails to leave a message, the unified messaging server may also send an email in text format to the forwarding email address containing only the incoming call attribute, such as the caller number.

Sixth, the destination subscriber sets a contact manner of call converted to data message in the intelligent routing policy. The data message may be one of a short message, a multimedia message, an instant message or a paging message, and the contact manner includes one or more corresponding destination numbers, showing that the caller side information and/or the message left of the incoming call shall be forwarded based on the type of data message to destination addresses one by one according to a predetermined order until a destination address receives the data message, or until none of the destination addresses can be reached. Specifically, the method includes the processes of generating a data message containing the caller side information and/or the message left of the incoming call by a unified messaging server, forwarding the data message to destination addresses of the data message one by one according to a predetermined order until a destination address receives the data message, or until none of the destination addresses can be reached. The data message may be generated through one of the following methods.

In one method, the intelligent routing processing module initiates a new initial request to the unified messaging server for the incoming call. In the new initial request, it is indicated that the incoming call shall be converted to a data message, and the destination numbers are designated. In response to receiving and parsing the new initial request, the unified messaging server applies for media resources to notify the caller of the incoming call to leave a message, and, when the caller has left a message, generates a data message containing the caller number of the incoming call and the message left by the caller.

In the other method, the intelligent routing processing module directly applies for media resources to notify the caller to leave a message, and, when the caller has left a message, sends certain message containing the caller number of the incoming call and the message left by the caller to the unified messaging server to indicate that the incoming call shall be converted to a type of data message and to designate the destination addresses. In response to receiving the message, the unified messaging server parses the message and generates a data message that contains both the caller number of the incoming call and the message left by the caller.

The format of the message left by the caller may be one of the following: URL link address of a record file, a record file in MIME format (the MIME format cannot be employed when the data message is SMS or Paging message), the text format of a record converted by an ASR resource for which the unified messaging server or intelligent routing processing module has applied.

If the caller fails to leave a message, the unified messaging server may also send a message in text format that only contains the incoming call attribute, such as the caller number, to the destination number.

Seventh, the destination subscriber sets a contact manner of call distributing in the intelligent routing policy, which includes one or more pickup group numbers, inter-group distribution modes and in-group distribution modes, showing that the incoming call shall be distributed to an idle subscriber in these pickup groups according to a designated distribution mode until the incoming call is answered, or until none of subscribers in the pickup groups can answer. The intelligent routing processing module distributes the incoming call to a pickup group according to a designated inter-group distribution mode, and further calls the idle subscriber in the pickup group according to a designated in-group distribution mode, until the incoming call is answered or none of subscribers in the pickup groups can answer.

The inter-group distribution modes include:
distributing in sequence, i.e., according to the sequence of the pickup group numbers;
distributing to the idlest one, i.e., according to the number of idle subscribers in each pickup group.

The in-group distribution modes include:
distributing simultaneously, i.e., initiating a call to all idle subscribers in the pickup group at the same time by the intelligent routing processing module in response to receiving the incoming call;
distributing in sequence, i.e., initiating calls to idle subscribers in the pickup group according to the sequence of the identities of the idle subscribers.

Eighth, the destination subscriber sets a contact manner of call waiting in the intelligent routing policy, showing that the incoming call shall be waiting when the destination subscriber is busy, and the destination subscriber is notified that there is a new incoming call. The intelligent routing processing module should employ the contact manner of call waiting when the destination subscriber of the incoming call is in conversation. The intelligent routing processing module plays a prompting tone or sends a prompting message such as an SIP message to notify the caller of the new incoming call to wait. Meanwhile the intelligent routing processing module also plays a prompting tone or sends a prompting message such as an SIP message to notify the destination subscriber of the new incoming call, the destination subscriber may choose to answer the new incoming call through an operation.

Generally, the intelligent routing processing module will initiate a call waiting timer for the incoming call to monitor the call waiting state, if the incoming call has not been answered when the call waiting timer expires, the intelligent routing processing module will usually release the incoming call. The duration of the call waiting timer can be designated directly by the destination subscriber in the intelligent routing policy, or designated by default by the intelligent routing processing module.

Ninth, the destination subscriber sets a contact manner of queue in the intelligent routing policy, showing that the incoming call shall be waiting in the queue of the destination subscriber. The intelligent routing processing module assigns a queue to the destination subscriber to store information of the incoming call, and plays a prompting tone or sends a prompting message such as an SIP message to the caller of the incoming call, notifying the caller to queue. Generally, the intelligent routing processing module will initiate a queue timer for the incoming call to monitor the state of the incoming call, if the incoming call has not been answered yet when the queue timer expires, the intelligent routing processing module will usually release the incoming call. The duration of the queue timer can be designated directly by the destination subscriber in the intelligent routing policy, or designated by default by the intelligent routing processing module. The destination subscriber may answer the incoming call through one of the following methods.

(1) The intelligent routing processing module sends a prompting message to the destination subscriber, e.g., an SIP message, for notifying the destination subscriber of a new incoming call; information of incoming calls is displayed on a kind of terminal interface of the destination subscriber according to calling time, and the destination subscriber may choose to answer one of the incoming calls through an operation, then the intelligent routing processing module deletes the information of the answered incoming call from the queue.

(2) The intelligent touting processing module retrieves, when the destination subscriber is idle, the information of an incoming call from the queue according to the rule of First In First Out, and initiates a new initial request to the destination subscriber; when the incoming call is answered, the intelligent routing process module deletes the information of the answered incoming call from the queue.

Tenth, the destination subscriber sets a contact manner of announcement pickup in the intelligent routing policy, which includes an announcement type, showing that a designated announcement will be played to the caller of the incoming call. The intelligent routing processing module applies for corresponding resources of announcement according to the type of the designated announcement, creates a session between the incoming call and the corresponding resources of announcement, and the caller of the incoming call listens to the designated announcement.

The announcement may be set by the network, or be recorded in advance by the destination subscriber. For example, when the announcement type is "number change announcement", the announcement may be set by the network, the destination subscriber sets a new destination number in the contact manner in advance and the intelligent routing processing module applies for the resources of announcement with the new destination number; or the announcement may also be recorded by the destination subscriber in advance, giving the new destination number in the announcement recorded.

If the application of the announcement pickup succeeds and there are other contact manners in the intelligent routing policy, the intelligent routing processing module continues with the rest contact manners until the application of the last contact manner or the application of one contact manner before the last contact manner succeeds.

Eleventh, the destination subscriber sets a contact manner of callback register in the intelligent routing policy, which includes a callback condition which is called presence information that must be different from the called presence information in the intelligent routing conditions corresponding to the intelligent routing policy. The callback condition shows that the calling and the called sides of the incoming call shall be recorded and the incoming call shall be released, such that a connection between the calling and the called sides shall be created automatically when the callback condition is triggered. The intelligent routing processing module records the caller number, the called number and the callback condition of the incoming call, and releases the incoming call in response to setting a "callback activation identity" for the called party. In a successful application of the contact manner of callback register, the caller of the incoming call may be called back when the called presence information changes into the callback condition.

When the called presence information changes, the intelligent routing processing module determines that the "callback activation identity" is valid and that the called presence information is the callback condition currently, the intelligent routing processing module invokes a callback service and establishes a call automatically between the caller and the called party when both of the caller and the called party are idle, and connects a conversation between the caller and the called party.

The intelligent routing policy includes one or more contact manners customized in advance; whether the processing order of the contact manners is logically appropriate may be determined by the destination subscriber while configuring data for customizing a service without intervention of a system, or the system may provide data consistency check when the data is configured, and the data consistency check is performed according to some agreed conditions, e.g., incoming call barring or callback register should be a last contact manner in an intelligent routing policy usually.

It can be seen from the above that contact may be created for an incoming call, e.g., a voice or video incoming call with a designated destination through one or more contact manners customized by the destination subscriber in advance; when the destination subscriber wishes, he can always establish a session connection successfully for the incoming call according to his desire and current scenario, and he may always establish an effective connection for the incoming call through contact manners available currently. In this way, not only the call completion rate, but also the income of operators is increased.

And the subscriber can design different intelligent routing policies conveniently for designated incoming calls. The following are some examples.

When a subscriber is on a business trip, an announcement recorded by the subscriber in advance may be played for an incoming call to indicate the current status of the subscriber and the record of the incoming call may be converted to email.

When the contact number of the subscriber changes, a "number change announcement" may be played for an incoming call to inform the caller of current contact number, then the incoming call may be forwarded to the current contact number.

An enterprise may configure call intelligent routing policies for his telephone exchange or hotline number, e.g., it may set a first contact manner to distribute incoming calls among one or more pickup groups (operator attendant groups), a second contact manner to make the incoming calls queue, a third contact manner to convert the incoming calls to emails.

Another method and system provided by embodiments of the present invention for intelligent routing are described below.

The method and system for intelligent routing in accordance with the embodiments of the present invention provide, for an incoming message with a designated destination, e.g. SMS, MMS, IM, email, voice mail, FAX and paging, a unified messaging intelligent routing service based on one or more called attribute identities, the incoming call attribute, the called presence information and the current time. Thus the incoming message may be processed according to one or more routing contact manners in the intelligent routing policy customized by the destination subscriber in advance, until the application of a contact manner succeeds (the application of automatic message answer excluded) or the applications of all contact manners are handle. When a message is successfully established, the destination subscriber may be notified through a contact manner customized in advance. Embodiments of the present invention are based on unified messaging system, the conversion of types of the message brought about by the unified messaging intelligent routing service is in the field of unified messaging system technology and would not be described herein, where the conversion includes the conversion of the content media in the message.

Figure 3:
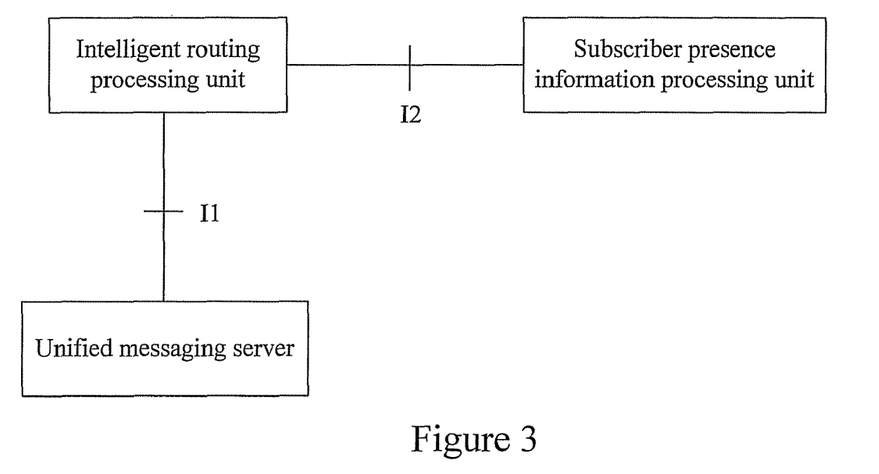
FIG. 3 is a schematic diagram illustrating the structure of a system for intelligent routing in accordance with an embodiment of the present invention.

The second intelligent routing system in accordance with an embodiment of the present invention is shown in FIG. 3, including a unified messaging server, an intelligent routing processing module and a subscriber presence information processing module.

The unified messaging server provides a unified messaging service and functions of converting and sending various types of messages. Generally, the unified messaging server is an independent physical device.

The intelligent routing processing module provides the subscriber with hosting environment of a unified messaging intelligent routing service, it may be an independent physical device, e.g., an application server, with interface I1 being a Session Initiation Protocol (SIP) interface; or, it may be configured, with the interface I1 being a self-defining internal interface, in the unified messaging server.

The subscriber presence information processing module collects and publishes the subscriber presence information, and provides subscriber presence information needed in service control, including explicit presence information and implicit presence information, and the subscriber presence information processing module may be a logic function network element. Optionally the subscriber presence information processing module may be an independent physical device such as a presence server, with the interface I2 being an SIP interface, and the subscriber presence information processing module sends the subscriber presence information to the intelligent routing processing module in certain manner; or the subscriber presence information processing module may be configured, with the interface I2 being a self-defining internal interface, in the intelligent routing processing module.

The destination subscriber described in the method and system for intelligent routing in accordance with an embodiment of the present invention has a public identity that is identifiable and unique in the home communication network of the incoming message, i.e., a destination address. The public identity may be a cell phone number of the subscriber, a URL address, a FAX number or the like.

The called attribute identity may be the destination address or the number of a group to which the called party belongs, and an intelligent routing trigger condition includes the called attribute identity, the incoming call attribute, the called presence information and current time. An intelligent routing trigger condition may correspond to multiple intelligent routing contact manners including keeping incoming mode, message forwarding, message converted to call, group sending, incoming messaging barring and automatic message answer.

The intelligent routing processing module receives a message in interface I1 protocol format from the unified messaging server, acquires the destination address from the message and records the destination address. The intelligent routing processing module searches the attribute data sheet of the destination subscriber in a manner, acquires and records valid numbers of groups to which the called party belongs, e.g., Centrex group number, pickup group number, etc. A pickup group is a group in which all members may pick up an incoming message in a manner.

The intelligent routing processing module receives the message in interface I1 protocol format from the unified messaging server, acquires and records the incoming message attribute which may be one or any combination of the caller address, the incoming message type and the content media type. The incoming message type includes SMS, MMS, IM, email, voice mail, FAX, paging, etc.; the content media type includes text, audio, video, picture, etc.

The called presence information is one or the combination of the explicit presence information and the implicit presence information of the destination subscriber. The explicit presence information is the presence information published by a subscriber in a network through a means, e.g. through an SIP PUBLISH message which is from a subscriber terminal to the network and contains the presence information; the implicit presence information is the natural presence information of the subscriber terminal in the network, such as call states and network locations. The methods through which the intelligent routing processing module acquires the subscriber presence information include the following two.

Method A: the unified messaging server triggers a message containing the presence information published by the subscriber or the natural presence information through a means to the intelligent routing processing module. The message may be an SIP PUBLISH message, a call signaling message, a network registration message, a network de-registration message, etc. The intelligent routing processing module acquires and records the subscriber presence information from the message Method B: the subscriber presence information is maintained and managed by a presence server in the network and the intelligent routing processing module subscribes to the subscriber presence information needed at the presence server through a subscription message, e.g., an SIP SUBSCRIBE message. The presence server informs, e.g., through an SIP NOTIFY message, the intelligent routing processing module of the subscriber presence information when the subscription message is received or when the subscriber presence information changes.

The destination subscriber has to customize intelligent routing trigger conditions and intelligent routing contact manners corresponding to the intelligent routing trigger conditions in advance so as to utilize the unified messaging intelligent routing service. Generally, intelligent routing trigger conditions and intelligent routing contact manners can be designed in the form of data sheet called unified messaging intelligent routing service data sheet. As the called attribute identity may be the destination number or the number of a group to which the called party belongs, such as a Centrex group number or a pickup group number, there are actually multiple call intelligent routing service data sheets, such as the subscriber unified messaging intelligent routing service data sheet, the Centex group unified messaging intelligent routing service data sheet, and the pickup group unified messaging intelligent routing service data sheet. Table 3 and Table 4 below describe exemplary designs of the subscriber unified messaging intelligent routing service data sheet and the Centex group unified messaging intelligent routing service data sheet respectively (the two data sheets below do not include all possible fields and are not the only format of such data sheets).

TABLE 3

| Intelligent routing trigger conditions | | | | | Intelligent routing contact manners | Notification manner |
|---|---|---|---|---|---|---|
| Destination address | Incoming message attribute | Called presence information | Time | Processing order No. | Keeping incoming mode Message forwarding Message converted to call Group sending Incoming messaging barring Automatic message answer | Notification manner of a message establishment success: IM, SMS, Paging, MWI, etc. |

The processing order number includes Arabic numerals starting from 1, indicating the processing order of the contact manners of an intelligent routing policy. Six intelligent contact manners are given in the examples above and every entry set by the destination subscriber in the data sheet may include only one contact manner, i.e., an intelligent routing trigger condition plus a processing order number matches only one contact manner and one possible notification manner of a message establishment success. The notification manner of a message establishment success includes corresponding notification address, and may be one of IM, SMS, Paging Messaging and Message Waiting Indicator (MWI).

TABLE 4

| Intelligent routing trigger conditions | | | | | Intelligent routing contact manners | Notification manner |
|---|---|---|---|---|---|---|
| Number of the Centrex group to which the called party belongs | Incoming message attribute | Called presence information | Time | Processing order No. | Keeping incoming mode Message forwarding Message converted to Call Group sending Incoming messaging barring Automatic message answer | Notification manner of a message establishment success: IM, SMS, Paging, MWI, etc. |

One intelligent routing trigger condition may correspond to one or more contact manners with different processing order numbers, and multiple contact manners organized in a series according to the processing order numbers form an intelligent routing policy.

The destination subscriber may set the unified messaging intelligent routing service data sheets above in a manner according to his own wish, and the data in the data sheets will be loaded into the intelligent routing processing module. The called attribute identity is a required field while the fields of incoming message attribute, called presence information and time are optional. If the subscriber does not set a value for an optional field, the optional field will not be considered while matching the intelligent routing trigger conditions.

Figure 4:
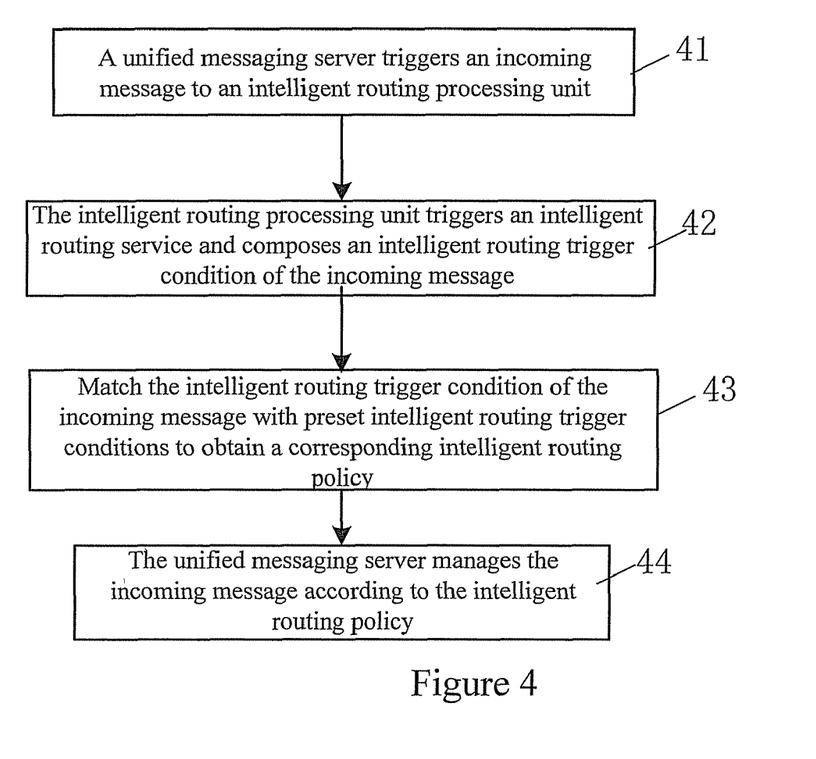
FIG. 4 is a flowchart of a method for intelligent routing in accordance with an embodiment of the present invention.

The flowchart of the method provided by an embodiment of the present invention for unified messaging intelligent routing is shown in FIG. 4, including the following Blocks.

Block 41: a unified messaging server triggers an incoming message to an intelligent routing processing module without conditions or according to the static configuration data. The incoming message may be SMS, MMS, IM, email, voice mail, FAX, Paging, etc.

In response to receiving an initial request of the incoming message, or in response to receiving a failure response to the incoming message after the incoming message is processed according to an original routing contact manner of the incoming message, the unified messaging server translates the incoming message into a message in interface I1 protocol format and sends the message to the intelligent routing processing module.

Block 42: the intelligent routing processing module triggers an intelligent routing service, acquires the destination address and the incoming message attribute (such as the caller address, the content media type, and the incoming message type), searches the attribute data sheet of the destination subscriber according to the destination address to obtain valid group numbers of groups to which the called party belongs, e.g., the Centrex group number or the pickup group number. The intelligent routing processing module composes an intelligent routing trigger condition with the destination address, the incoming message attribute, the called presence information obtained from the subscriber presence information processing module, and current time. If the destination subscriber has valid group numbers, different intelligent routing trigger conditions may be composed with different group numbers, the same incoming message attribute, called presence information and current time.

The trigger point at which the intelligent routing processing module triggers the call intelligent routing service for one incoming message may be one of the following three scenarios:

(1) the intelligent routing processing module triggers the intelligent routing service once only in response to receiving the initial request of the incoming message in interface I1 format;

(2) the intelligent routing processing module triggers the intelligent routing service once only in response to receiving a first failure response of the incoming message in interface I1 format;

(3) when the intelligent routing processing module has triggered the intelligent routing service once in response to receiving the initial request of the incoming message in interface I1 format and an application of the intelligent routing service has failed, the intelligent routing processing module triggers the intelligent routing service once again only in response to receiving the first failure response of the incoming message in interface I1 format.

Block 43: the intelligent routing processing module matches the intelligent routing trigger condition of the incoming message with the intelligent routing trigger conditions preset in the unified messaging intelligent routing service data sheet so as to obtain a corresponding intelligent routing policy, and the intelligent routing processing module provides the corresponding intelligent routing policy to the unified messaging server.

In the embodiment of the present invention, the called attribute identity may be the destination address and the numbers of the groups to which the called party belongs, so there may be one or more intelligent routing trigger conditions for one incoming message. When the intelligent routing processing module triggers the intelligent routing service, the intelligent routing processing module matches different called attribute identities (e.g., the destination address, the Centrex group number of the called party and the pickup group number of the called party) and the same incoming call attribute, called presence information and current time with all possible preset intelligent routing trigger conditions. When more than one intelligent routing policy is obtained by the intelligent routing processing module for one incoming message, every intelligent routing policy is processed according to an agreed or preset order, or only the intelligent routing policy with the highest priority is processed according to agreed or preset priority. Referring to Table 3, the intelligent routing processing module searches the subscriber unified messaging intelligent routing service data sheet according to the destination address, incoming call attribute, called presence information and current time, and obtains a subscriber intelligent routing policy if the search succeeds. Referring to Table 4, if the called party also has a valid group number such as a Centrex group number, the intelligent routing processing module also searches the Centrex group unified messaging intelligent routing service data sheet according to the Centrex group number, incoming call attribute, called presence information and current time, and obtains a Centrex group intelligent routing policy if the search succeeds.

The intelligent routing processing module sends to the unified messaging server a message in interface I1 format. The message contains intelligent routing contact manners and possible notification manners of a message establishment success corresponding to the contact manners by the following means:

one message contains all intelligent routing contact manners customized in advance and all possible notification manners; or, the intelligent routing processing module sends a message according to a predetermined order, the message containing a contact manner and a possible notification manner corresponding to the contact manner; if the unified messaging server fails to apply this contact manner, a failure response is translated into a message in interface I1 format by the unified messaging server to be sent to the intelligent routing processing module, and the intelligent routing processing module sends a second message containing a second contact manner and a possible notification manner according to the predetermined order, until the application of a contact manner succeeds (automatic message answer excluded), or until the applications of all contact manners customized in advance are used up.

Block 44: the unified messaging server parses the message which contains the intelligent routing contact manners, and performs corresponding management on the incoming message until the application of a contact manner succeeds (automatic message answer excluded), or until the applications of all contact manners customized in advance are used up.

When the unified messaging server manages the incoming message according to the intelligent routing policy, if the application of a contact manner succeeds (automatic message answer excluded), the unified messaging intelligent routing service is terminated even though there are still other contact manners that are customized in advance or other intelligent routing policies left unprocessed. If the applications of all contact manners fail (automatic message answer excluded) in an intelligent routing policy, the intelligent routing processing module continues with the other intelligent routing policies when there are still other intelligent routing policies to be applied, or the unified messaging intelligent routing service is terminated when there are not other intelligent routing policies to be applied.

When a message is established successfully, the unified messaging server notifies the destination subscriber of the incoming message through a notification manner of a message establishment success corresponding to the contact manner, such that the destination subscriber may check the incoming message in time. IM, SMS, Paging Messaging and MWI may be employed to notify the destination subscriber. For example, when the unified messaging server creates a voice mail for the destination subscriber, the destination subscriber may be notified through a short message.

The intelligent routing contact manners above are described below.

First, the destination subscriber sets a contact manner of keeping incoming mode in the intelligent routing policy, showing that the incoming message is routed directly according to a contact manner designated in the incoming message. The unified messaging server processes the incoming message according to the contact manner designated in the incoming message without modifying the incoming message until the incoming message is successfully established or fails to be established.

Second, the destination subscriber sets in the intelligent routing policy a contact manner of message forwarding. The contact manner of message forwarding includes one or multiple forwarding destination addresses, and forwarding message types corresponding to the forwarding destination addresses respectively. The forwarding message types may include SMS, MMS, IM, email, voice mail, FAX and Paging Messaging. Through the contact manner of message forwarding, the incoming message is forwarded to the forwarding destination addresses in turn according to a predetermined order until a forwarding destination address receives the message, or until none of the forwarding destination addresses could be reached. The unified messaging server processes each forwarding destination address and forwarding message type corresponding to the forwarding destination address according to the predetermined order. The unified messaging server first determines whether the incoming message type is identical with the forwarding message type. If not identical, the incoming message type is converted into the forwarding message type, including necessary conversion of the content media type. If identical, the incoming message need not be converted. Then the unified messaging server initiates a new message request to the forwarding destination address until the message is successfully established, or until none of the forwarding destination addresses can be reached.

When the forwarding message type does not support the content media type of the incoming message, the unified messaging server determines whether a content media type can be converted to that supported by the forwarding message type, if yes, the unified messaging server converts the content media type, e.g., converts audio to text, text to audio, or the like. The unified messaging server may apply for ASR media resources or Text-to-Speech (TTS) media resources to perform corresponding conversion. If the content media type can not be converted to that supported by the forwarding message type, e.g., the content media type of the incoming message is a picture and the forwarding message type is SMS, the unified messaging server may include a URL link address of the content media of the incoming message in the forwarding message translated.

Third, the destination subscriber sets in the intelligent routing policy a contact manner of message converted to call, which includes one or multiple call numbers, showing that media channels to the call numbers are established for the voice media contained in the incoming message or are established for the voice media forwarded from the incoming message according to a predetermined order until a call number receives the voice media, or until none of the call numbers can be reached. The unified messaging server initiates calls to the call numbers according to the predetermined order until the terminal of a call number answers, then a media channel to the call number is established for the voice media contained in the incoming message or the voice media forwarded from the incoming message, thus the terminal may listen to the announcement. Optionally the unified messaging server initiates calls to the call numbers according to the predetermined order until none of the call numbers can be reached. If the content media type of the incoming message is text, the unified messaging server applies for TTS media resources to convert the text into voice.

Fourth, the destination subscriber in the intelligent routing policy sets a contact manner of group sending, which includes one or multiple group sending destination addresses and group sending types corresponding to the group sending destination addresses respectively. The group sending types may be one of SMS, MMS, IM, email, voice mail, FAX and Paging. Through the contact manner of group sending, the incoming message is forwarded to all the forwarding destination addresses at the same time. The unified messaging server processes all group sending destination addresses and corresponding group sending types at the same time. The unified messaging server first determines whether the incoming message type is identical with the group sending types. If not identical, the incoming message type is converted into the group sending type, including necessary conversion of the content media type; otherwise, the incoming message need not be converted. The unified messaging server initiates a new message request to all group sending destination addresses at the same time.

When the group sending type does not support the content media type of the incoming message, the unified messaging server determines whether a content media type can be converted to that supported by the group sending type, if yes, the unified messaging server converts the content media type of the incoming message, e.g., converts audio to text, text to audio or the like. The unified messaging server may apply for ASR media resources or Text-to-Speech (TTS) media resources to perform corresponding conversion. If the content media type can not be converted to that supported by the group sending type, e.g., the content media type of the incoming message is a picture and the group sending type is an SMS, the unified messaging server may give a URL link address of the content media of the incoming message in translated contents of the group sending messages.

Fifth, the destination subscriber sets in the intelligent routing policy a contact manner of incoming messaging barring, which includes one or multiple barring rules, for example, the content of the incoming message includes a certain word. Through the contact manner of incoming messaging barring, the incoming message will be barred. The unified messaging server bars the incoming message directly and the application of such contact manner succeeds.

Sixth, the destination subscriber sets in the intelligent routing policy a contact manner of automatic message answer, the contact manner of automatic message answer including pickup message contents inputted by the subscriber in advance, showing that the pickup message contents are replied to the incoming message automatically. The unified messaging server directly replies the incoming message with the pickup message contents inputted by the subscriber, and the application of such contact manner succeeds. When there are still other intelligent routing contact manners left unprocessed after the application of automatic message answer has succeeded, these other intelligent routing contact manners shall continue to be processed until the application of one of them succeeds, or until the applications of all these other intelligent routing contact manners fail, then the intelligent routing service is terminated.

In the embodiment of the present invention, the intelligent routing policy includes one or multiple contact manners customized in advance; whether the processing order of the contact manners is logically appropriate may be determined by the destination subscriber while customizing the intelligent routing service without system intervention, or the system may provide data consistency check when the intelligent routing service is customized and the data is set, and the data consistency check is performed according to some agreed conditions, e.g., incoming messaging barring may only be the last contact manner usually in an intelligent routing policy, and the contact manner should not be message converted to call when the content media type in the incoming message attribute is set as picture.

Similarly, the system may also determine whether the notification manner of a message establishment success is appropriate through data consistency check according to agreed conditions, e.g., no notification manner of a message establishment success shall be set when the contact manner is incoming messaging barring or automatic message answer, the incoming message type in the incoming message attribute of an intelligent routing trigger condition should not be the same as the notification manner of the message establishment success set by the destination subscriber.

Compared with the prior art, the embodiments of the present invention adopt an intelligent routing processing module which sets intelligent routing trigger conditions and corresponding intelligent routing policies in advance. In the embodiments of the present invention, an incoming call or message is processed in accordance with an intelligent routing contact manner in an intelligent routing policy. The intelligent routing trigger conditions include the called attribute identity, the incoming call attribute, the called presence information and the current time, and an intelligent routing policy may include one or more intelligent routing contact manners. Therefore, according to the embodiments of the present invention, the problem of communication routing technology in the prior art may be solved with regard to the lack of routing contact manners and routing policies, and the subscriber presence information may be fully utilized.

Particularly, the embodiments of the present invention provide the following benefits for routing an incoming call.

First, the contact may be established for a voice or video call with a designated destination through one or multiple contact manners preset by the destination subscriber. If the destination subscriber wishes, session contact may always be established successfully for an incoming call according to his design and current scenario, and an effective contact is always established for the incoming call through contact manners available currently. In this way not only call completion rate, but also the income of operators is increased.

Second, the subscriber may conveniently design different routing policies for specific incoming calls, e.g., when the subscriber is on a business trip, an announcement recorded in advance may be played for an incoming call to inform the caller of current situations and the incoming call may be recorded and converted to an email.

Third, when a contact number of the subscriber changes, an announcement may be played for an incoming call to inform the caller of the number alteration and the current contact number, the incoming call may then be forwarded to the current contact number.

Fourth, an enterprise user may set a call intelligent routing policy for his telephone exchange or hotline, e.g., it may set a first contact manner to distribute calls among one or multiple pickup groups (operator attendant groups), a second contact manner to make the incoming calls queue, a third contact manner to convert calls to emails.

The embodiments of the present invention also provide technical merits for routing process in a unified messaging service.

According to the embodiments of the present invention, through one or multiple contact manners preset by the destination subscriber, the contact may be established for a certain type of messages with designated destination, such as SMS, MMS, IM, email, voice mail, FAX and paging. The destination subscriber may always establish session contact successfully for an incoming message according to his/her design and current scenario, and always establish effective contact for the incoming message through contact manners available currently. Therefore the technical solutions of the present invention bring about great convenience to subscribers.

According to the embodiments of the present invention, the subscriber may easily design different routing policies for incoming messages. For example, when the subscriber is driving and it will be inconvenient for him to check short messages, he may wish to convert the short messages from his family to voice calls to be answered through an onboard mobile phone, then he may publish explicit presence information, stating "I'm driving", through an SIP PUBLISH message, and establish an entry in the data sheet of unified messaging intelligent routing service of the subscriber. In the data sheet, the caller address in the incoming message attributes is set as the cell phone number of his family, the incoming message type is SMS, the called presence information is "I'm driving" and the contact manner is message converted to call.

Obviously, those skilled in the art may make numerous changes and variations on the solution of this invention without departing from the spirit and scope thereof. Accordingly, it is intended that this invention includes the changes and variations in case that such changes and variations come within the scope as set forth in the appended claims and the equivalent techniques thereof.

What is claimed is:

1. A method for intelligent routing, comprising:
   triggering an incoming call to an intelligent routing processing module at a designated trigger point;
   triggering, by the intelligent routing processing module, an intelligent routing service, acquiring relevant information of the incoming call and composing at least one intelligent routing trigger condition of the incoming call with the relevant information; wherein the relevant information of the incoming call comprises a called attribute identity, an incoming call attribute, called presence information and current time;
   matching the intelligent routing trigger condition of the incoming call with preset intelligent routing trigger conditions and obtaining at least one intelligent routing policy comprising more than one intelligent routing contact manner with a processing order; wherein the matching the intelligent routing trigger condition of the incoming call with preset intelligent routing trigger conditions and obtaining at least one intelligent routing policy comprises: matching the called attribute identity, the incoming call attribute, the called presence information and the current time of the incoming call with all preset intelligent trigger conditions in turn, to obtain the at least one intelligent routing policy;
   routing the incoming call according to the intelligent routing contact manner in the at least one intelligent routing policy.

2. The method of claim 1, wherein the triggering the incoming call to the intelligent routing processing module at the designated trigger point comprises:
   triggering, by a call session control function unit, the incoming call to the intelligent routing processing module only when receiving an initial request of the incoming call, or when receiving a failure response to the incoming call in response to routing the incoming call.

3. The method of claim 1, wherein, for one incoming call, the intelligent routing processing module triggers the intelligent routing service once only when an initial request of the incoming call is received or when a first failure response to the incoming call is received; or the intelligent routing processing module triggers the intelligent routing service once again only when the first failure response to the incoming call is received after an application of the intelligent routing service fails with the intelligent routing service triggered in response to receiving the initial request of the incoming call.

4. The method of claim 1, wherein
   the called attribute identity is one of a called number and a number of a user group to which a called party belongs;
   the incoming call attribute comprises at least one of a caller number, a media type of the incoming call and a call attribute of the incoming call;
   the called presence information is at least one of explicit presence information and implicit presence information of the called party; and
   the composing at least one intelligent routing trigger condition of the incoming call with the relevant information comprises one of:
   composing one intelligent routing trigger condition with one called attribute identity, the incoming call attribute, the called presence information and the current time; and
   composing more than one intelligent routing trigger condition with at least two different called attribute identities and the same incoming call attribute, called presence information and current time.

5. The method of claim 1, wherein the acquiring, by the intelligent routing processing module, the called presence information comprises one of:
   triggering, by a call session control function unit of a home domain of the called party, a message containing the called presence information to the intelligent routing processing module, acquiring and recording, by the intelligent routing processing module, the called presence information from the message; and
   managing, by a presence server in a network, the called presence information;
   subscribing, by the intelligent routing processing module, to called presence information at the presence server and informing, by the presence server, the intelligent routing processing module of the called presence information in one of the case that subscription information is received and the case that the called presence information changes.

6. The method of claim 1, wherein the intelligent routing contact manner comprises: incoming call barring, serial call forwarding, parallel call forwarding, call forwarded to voice mailbox or secretary station, call converted to email, call converted to data message, call distributing, call waiting, queue, announcement pickup and callback register.

7. The method of claim 6, wherein the routing the incoming call when the intelligent routing contact manner is call converted to data message comprises:
   sending the incoming call to a unified messaging server where the incoming call is converted into a data message; and routing the data message.

8. The method of claim 6, wherein, when multiple intelligent routing policies are obtained, the incoming call is processed according to an agreed or preset order of the multiple intelligent routing policies, or the incoming call is processed in accordance with one of the multiple intelligent routing policies with the highest priority according to agreed or preset priority.

9. The method of claim 6, wherein the incoming call is processed in accordance with intelligent routing contact manners in a predetermined order when the intelligent routing policy comprises more than one intelligent routing contact manner.

10. The method of claim 9, wherein, when the incoming call is processed according to the at least one intelligent routing policy, the intelligent routing service is terminated in one of the case that an application of one intelligent routing contact manner succeeds and the case that applications of all the intelligent routing contact manners fail.

11. The method of claim 9, wherein, when an application of announcement pickup succeeds, if there are still other intelligent routing contact manners left unprocessed, the other intelligent routing contact manners continue to be processed until an application of one of the other intelligent routing contact manners succeeds or until applications of all the other intelligent routing contact manners fail; and
the intelligent routing service is terminated.

12. A system for intelligent routing, comprising:
a call session control function unit, configured to trigger an incoming call;
an intelligent routing processing module, in communication with the call session control function unit, configured to receive the incoming call from the call session control function unit, performing logic control for an intelligent routing service through the steps of:
acquiring relevant information of the incoming call and composing at least one intelligent routing trigger condition of the incoming call with the relevant information;
matching the intelligent routing trigger condition of the incoming call with preset intelligent routing trigger conditions and obtaining at least one intelligent routing policy comprising more than one intelligent routing contact manner with a processing order; and routing the incoming call according to the intelligent routing contact manner in the at least one intelligent routing policy and subscriber presence information; wherein the relevant information of the incoming call comprises a called attribute identity, and incoming call attribute, called presence information and current time; the matching the intelligent routing trigger condition of the incoming call with preset intelligent routing trigger conditions and obtaining at least one intelligent routing policy comprises: matching the called attribute identity, the incoming call attribute, the called presence information and the current time of the incoming call with all preset intelligent trigger conditions in turn, to obtain the at least one intelligent routing policy; and
a subscriber presence information processing module, in communication with one of the intelligent routing processing module and the call session control function unit, configured to collect and publish the subscriber presence information and provide the subscriber presence information for the intelligent routing processing module.

13. The system of claim 12, further comprising: a unified messaging server, in communication with one of the intelligent routing processing module and the call cession control function, configured to process a message in the intelligent routing service.

14. The system of claim 13, wherein
the call session control function unit, the intelligent routing processing module, the unified messaging server and the subscriber presence information processing module are separate from each other; or
the intelligent routing processing module is configured in the call session control function unit; or
the subscriber presence information processing module is configured in the intelligent routing processing module.

15. A method for intelligent routing, comprising:
triggering an incoming message to an intelligent routing processing module;
triggering, by the intelligent routing processing module, an intelligent routing service, acquiring relevant information of the incoming message and composing at least one intelligent routing trigger condition of the incoming message with the relevant information of the incoming message, wherein the relevant information of the incoming message comprises a called attribute identity, an incoming message attribute, called presence information and current time;
matching, by the intelligent routing processing module, the intelligent routing trigger condition of the incoming message with preset intelligent routing trigger conditions, obtaining at least one intelligent routing policy which comprises more than one intelligent routing contact manner with a processing order and sending the at least one intelligent routing policy to a unified messaging server; wherein the matching the intelligent routing trigger condition of the incoming message with preset intelligent routing trigger conditions and obtaining at least one intelligent routing polic comprises: matching the called attribute identity, the incoming message attribute, the called presence information and the current time of the incoming message with allpreset intelligent trigger conditions in turn, to obtain the at least one intelligent routing policy; and
routing, by the unified messaging server, the incoming message according to the intelligent routing contact manner in the at least one intelligent routing policy.

16. The method of claim 15, wherein
the unified messaging server triggers the incoming message to the intelligent routing processing module once in one of the case that an initial request of the incoming message is received and the case that a failure response to the incoming message is received after the incoming message is routed out according to an original routing contact manner of the incoming message.

17. The method of claim 16, wherein, for one incoming message, the intelligent routing processing module triggers the intelligent routing service once in one of the case that the initial request of the incoming message is received and the case that a first failure response to the incoming message is received; or,
the intelligent routing processing module triggers the intelligent routing service once again when the first failure response to the incoming message is received after an application of the intelligent routing service fails with the intelligent routing service triggered in response to receiving the initial request of the incoming message.

18. The method of claim 15, wherein
the called attribute identity is one of a called address and a number of a user group to which a called party belongs;

the incoming message attribute comprises at least one of a caller address, an incoming message type and a content media type;

the called presence information is at least one of explicit presence information and implicit presence information of the called party;

the composing at least one intelligent routing trigger condition of the incoming message with the relevant information comprises one of:

composing one intelligent routing trigger condition with one called attribute identity, the incoming message attribute, the called presence information and the current time; and composing more than one intelligent routing trigger condition with at least two different called attribute identities and the same incoming message attribute, called presence information and current time.

19. The method of claim 15, wherein the acquiring, by the intelligent routing processing module, the called presence information comprises one of:

triggering, by the unified messaging server, a message containing the called presence information to the intelligent routing processing module, acquiring and recording, by the intelligent routing processing module, the called presence information from the message; and managing, by a presence server in a network, the called presence information, subscribing, by the intelligent routing processing module, to subscriber presence information needed at the presence server, and informing, by the presence server, the intelligent routing processing module of the called presence information in one of the case that subscription information is received and the case that the called presence information changes.

20. The method of claim 15, wherein, when multiple intelligent routing policies of the incoming message are obtained, the incoming message is processed according to an agreed or preset order of the multiple intelligent routing policies, or be processed in accordance with one of the multiple intelligent routing polices with the highest priority according to agreed or preset priority.

21. The method of claim 15, wherein the intelligent routing contact manner comprises:

keeping incoming mode, message forwarding, message converted to call, message group sending, incoming messaging barring and automatic message answer.

22. The method of claim 21, wherein the incoming message is processed in accordance with intelligent routing contact manners in a predetermined order when the intelligent routing policy comprises more than one intelligent routing contact manner.

23. The method of claim 22, wherein, when the incoming message is processed according to the intelligent routing policy, the intelligent routing service is terminated in one of the case that an application of one intelligent routing contact manner succeeds and the case that applications of all the intelligent routing contact manners fail.

24. The method of claim 22, wherein, when there are still other intelligent routing contact manners left unprocessed after the application of automatic message answer has succeeded, the other intelligent routing contact manners continue to be processed until an application of one of the other intelligent routing contact manners succeeds or until applications of all the other intelligent routing contact manners fail; and the intelligent routing service is terminated.

25. The method of claim 21, wherein the intelligent routing policy further comprises a notification manner of a message establishment success corresponding to an intelligent routing contact manner;

when the incoming message is successfully established through an intelligent routing contact manner, the unified messaging server informs a destination subscriber through the notification manner of a message establishment success corresponding to the intelligent routing contact manner.

26. The method of claim 25, wherein the notification manner of a message establishment success comprises instant messaging, short message service, paging messaging and message waiting indicator.

27. The method of claim 25, wherein the sending the intelligent routing policy to the unified messaging server comprises one of:

sending, by the intelligent routing processing module, to the unified messaging server a message that contains all the intelligent routing contact manners and all notification manners corresponding to the intelligent routing contact manners; and sending, by the intelligent routing processing module, a message which contains an intelligent routing contact manner and the notification manner corresponding to the intelligent routing contact manner, according to a processing order of the intelligent routing contact manners.

* * * * *

UNITED STATES PATENT AND TRADEMARK OFFICE
CERTIFICATE OF CORRECTION

| | | |
|---|---|---|
| PATENT NO. | : 8,374,326 B2 | Page 1 of 1 |
| APPLICATION NO. | : 11/845611 | |
| DATED | : February 12, 2013 | |
| INVENTOR(S) | : Youzhu Shi | |

It is certified that error appears in the above-identified patent and that said Letters Patent is hereby corrected as shown below:

Title Page, Abstract, line 5, "advances" should read --advance--.

Signed and Sealed this
Seventh Day of May, 2013

Teresa Stanek Rea
*Acting Director of the United States Patent and Trademark Office*